(12) United States Patent
Khan et al.

(10) Patent No.: US 8,856,920 B2
(45) Date of Patent: Oct. 7, 2014

(54) SYSTEM AND METHOD OF SECURELY PROCESSING LAWFULLY INTERCEPTED NETWORK TRAFFIC

(75) Inventors: Faud Ahmad Khan, Osgoode (CA); Dmitri Vinokurov, Ottawa (CA); Vinod Kumar Choyi, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1498 days.

(21) Appl. No.: 11/522,462

(22) Filed: Sep. 18, 2006

(65) Prior Publication Data

US 2008/0127335 A1 May 29, 2008

(51) Int. Cl.
*G06F 11/00* (2006.01)
*H04L 29/06* (2006.01)

(52) U.S. Cl.
CPC ............ *H04L 63/1425* (2013.01); *H04L 63/00* (2013.01); *H04L 63/30* (2013.01)
USPC ............ 726/22; 726/1; 726/3; 726/6; 726/12; 726/13; 726/14; 726/15; 726/26; 726/30; 713/153; 713/154; 713/160; 713/165

(58) Field of Classification Search
USPC .......................... 726/22, 13, 26; 713/160, 154
See application file for complete search history.

(56) References Cited

U.S. PATENT DOCUMENTS

| | | | | |
|---|---|---|---|---|
| 5,809,334 | A * | 9/1998 | Galdun et al. ................... | 710/22 |
| 6,665,269 | B1 * | 12/2003 | Schmitz ......................... | 370/251 |
| 7,080,408 | B1 | 7/2006 | Pak et al. | |
| 7,307,999 | B1 * | 12/2007 | Donaghey ...................... | 370/465 |
| 7,630,312 | B1 * | 12/2009 | Cheriton ........................ | 370/235 |
| 7,752,324 | B2 * | 7/2010 | Hamadeh et al. ............. | 709/230 |
| 2001/0039579 | A1 * | 11/2001 | Trcka et al. .................... | 709/224 |
| 2002/0083175 | A1 * | 6/2002 | Afek et al. ..................... | 709/225 |
| 2004/0064664 | A1 * | 4/2004 | Gil ................................. | 711/170 |
| 2005/0028013 | A1 * | 2/2005 | Cantrell et al. ............... | 713/201 |
| 2006/0059163 | A1 * | 3/2006 | Frattura et al. .................. | 707/10 |
| 2006/0072582 | A1 * | 4/2006 | Bronnimann et al. ... | 370/395.32 |
| 2006/0095968 | A1 | 5/2006 | Portolani et al. | |
| 2006/0185014 | A1 * | 8/2006 | Spatscheck et al. ............ | 726/23 |
| 2006/0191008 | A1 * | 8/2006 | Fernando et al. ............... | 726/23 |
| 2006/0209895 | A1 * | 9/2006 | Hirota ........................... | 370/469 |

(Continued)

FOREIGN PATENT DOCUMENTS

GB            2383444        6/2003

OTHER PUBLICATIONS

Hernandez-Valenicia et al, May 2002, IEEE, Hybrid Transport Solutions for TDM/Data Networking Services, pp. 104-112.*
Friday et al, 2001, ACM, A Wireless Public Access Infrastructure for Supporting Mobile Context-Aware IPv6 Applications, pp. 11-18.*

(Continued)

*Primary Examiner* — Luu Pham
*Assistant Examiner* — Jenise Jackson
(74) *Attorney, Agent, or Firm* — Kramer Amado, P.C.

(57) ABSTRACT

A system and method are provided for supporting storage and analysis by law enforcement agency premises equipment of intercepted network traffic. The system and method provide integrity of the intercepted network traffic stored in an archive in accordance with lawful intercept requirements by storing all of the intercepted traffic, both benign and malicious, in the archive in its original form. The system and method furthermore provide for security from any malicious data packets of the archive by separating the malicious packets from the benign packets and forwarding only the benign packets to analysis applications of the law enforcement agency premises equipment.

15 Claims, 7 Drawing Sheets

(56) References Cited

U.S. PATENT DOCUMENTS

2007/0192860 A1* 8/2007 Hiscock ................... 726/23
2009/0245132 A1* 10/2009 Beser ...................... 370/254
2010/0205672 A1* 8/2010 Milliken et al. ............ 726/24

OTHER PUBLICATIONS

Johnston, Development of a Legal Framework for Intrusion Detection, Lecture Notes in Computer Science, Springer Verlag, Berlin, DE vol. 2516, Jan. 1, 2002, pp. 138-157.

* cited by examiner

SYSTEM AND METHOD OF SECURELY PROCESSING LAWFULLY INTERCEPTED NETWORK TRAFFIC

FIELD OF THE INVENTION

The invention relates to supporting storage and analysis of network traffic intercepted by a law enforcement agency (LEA) and more particularly to providing protection for the LEA from malicious attacks from within and through the stored intercepted traffic while providing evidentiary compliance for the manner in which the intercepted traffic is stored.

BACKGROUND OF THE INVENTION

In the course of an investigation, a law enforcement agency may request a network service provider to assist in the intercept of desired information passing through the service provider's network. Typically the desired information which is helpful to the LEA's investigation is that which is related to the party or parties which are subjects of the investigation. Typically the information is contained in desired network IP traffic which reflects activities or forms part of communications by the suspect(s), individual(s), or organization(s) under investigation (referred to hereinafter as the suspect). The content of the traffic can take on many forms including but not limited to VoIP, e-mail, text messaging, streaming or download format video, document or data communication exchanges. To intercept this desired network traffic, the LEA requests from the network service provider a duplicate or mirror of network traffic meeting a certain set of criteria which it is believed will contain the desired information. Network traffic meeting these criteria and which has been intercepted in accordance therewith is referred to herein as intercepted traffic. Criteria for the desired network traffic could include that the traffic originates from a certain location, from a particular individual, organization or machine, at a specific time, or from a specific application. These criteria could also include that the traffic is being sent to a specific destination or is addressed to a particular individual, organization or machine.

Even when the network traffic is intercepted according to the set of criteria, much of that intercepted traffic might not constitute what is relevant to the investigation and therefore might not be helpful in furthering the investigation nor in supporting a future presentation in court of a case resulting from the investigation. The intercepted traffic will typically require analysis at the premises of the LEA to glean the desired information which could be helpful to move the investigation further along or which may prove to be useful in court. Analysis at the premises of the LEA is typically done on equipment including a computer system often connected to an internal network.

There are two specific challenges facing an LEA in the collection and analysis of network traffic for use in an investigation or in support of a court case. Firstly, any intercepted traffic must be kept in its totality in the sense that its integrity, as required by law or associated regulation, cannot be compromised. Failure to meet legal integrity requirements can invalidate the intercepted desired network traffic for forensic investigation and may cause it to be inadmissible in a court of law. These integrity requirements are also referred to as lawful intercept requirements (LIR). Secondly, the intercepted traffic may include malicious traffic which may threaten the LEA premises equipment, including its network, databases, and other resources. Attacks aimed at the LEA originating in the malicious traffic are referred to as "indirect" because they occur only when the intercepted traffic is accessed or replayed in the LEA premises which in general is at a later time than when the traffic was actually transmitted from the originator of the attack. Law enforcement agencies are particularly at risk since malicious traffic may specifically be created by a suspect being monitored in order to attack the LEA premises equipment as a countermeasure to the surveillance by the LEA. This attacker may try to affect efficiency of an analysis of the intercepted traffic or may be deliberately injecting malicious traffic that would later impact the LEA premises network back-end functions and possibly crash the LEA's systems or otherwise cause a denial of service. Such attacks could include application level floods, dummy sessions, software vulnerability exploits, or Trojans, among others. Denial of service attacks are a particular threat to the LEA if it is targeting and collecting data from the attacker's network which for example could be the case when the attacker is part of an organized criminal group.

A law enforcement agency has to deal with all of the intercepted traffic and also to protect its own resources from the impact that processing of the traffic may cause. In order to be able to do its primary job efficiently and cost-effectively, dealing with the data and providing security ideally should be performed simultaneously. In most cases the traffic making up an attack will not be of interest to the LEA since attack traffic usually does not carry information that an LEA normally has a warrant for and is interested in. This is true in most cases except when the attacks themselves are the subject of a computer crime investigation.

Figure 1:
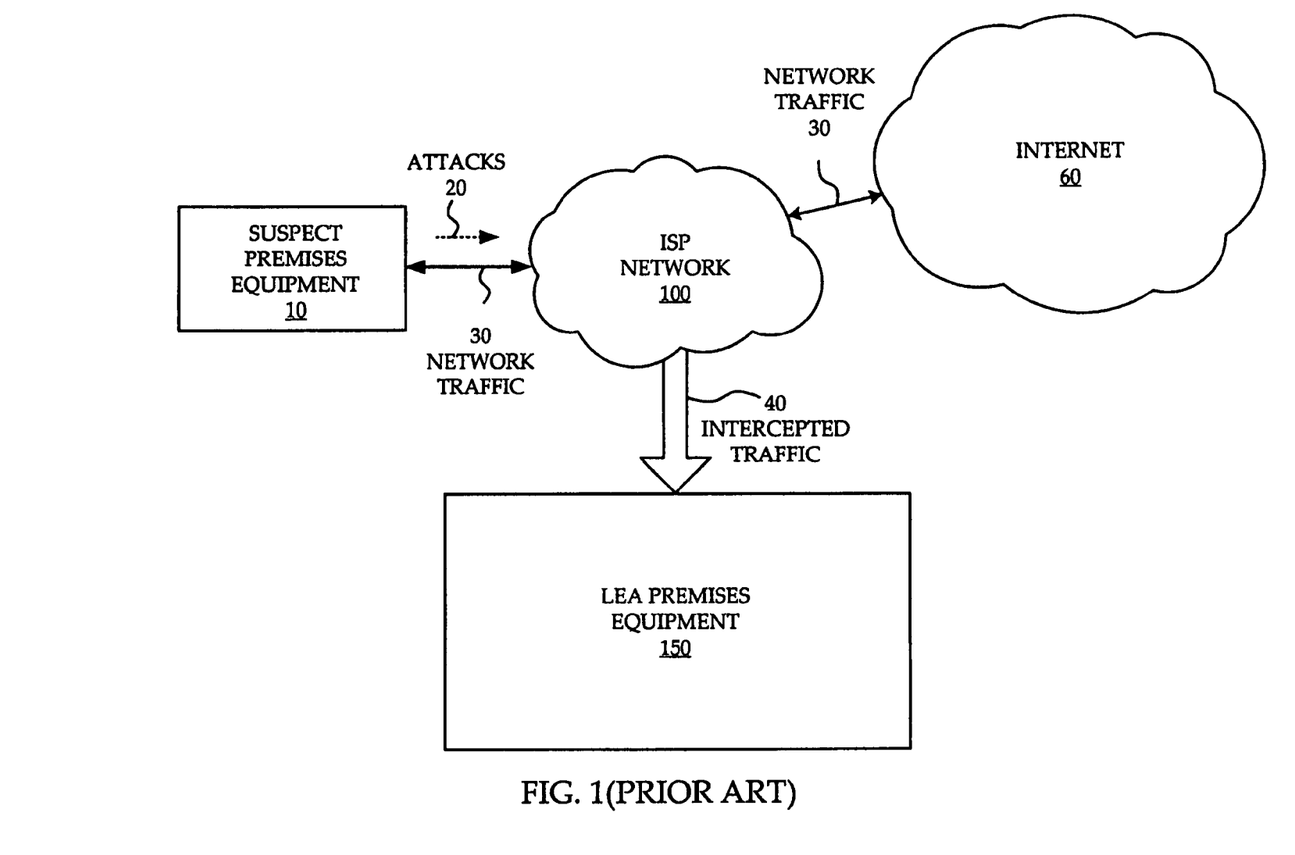
FIG. 1 is a schematic diagram illustrating known storage and analysis of lawfully intercepted network traffic.

According to the current practice which is depicted in FIG. 1, LEAs and network service providers employ a best effort approach. In this example, network traffic 30 having desired network traffic of interest to the LEA and which is to be intercepted, originates at a suspect premises equipment 10 and is destined for the internet 60 over an internet service provider's (ISP) network 100. The network service provider at the request of the LEA duplicates and forwards all of the network traffic passing through the ISP network 100 meeting the criteria as requested by the LEA, in the form of intercepted traffic 40 to the law enforcement agency's premises equipment 150. Management of the intercepted traffic 40 requires a relatively large computational and storage capacity which ideally would be efficient and would operate in a secure manner. Current ETSI (European Telecommunications Standards Institute) and 3GPP ($3^{rd}$ generation partnership project) standards only describe handover interfaces between the network service provider and the client (LEA equipment), and do not address any threat model or security measures for the LEA's own network and back-end functionality necessary for analyzing and storing the intercepted traffic. Most LEA's consider the most important "security" concern in respect of any stored intercepted traffic 40, as being that of ensuring protection of that stored intercepted traffic 40 from unauthorized access, whether in the form of unauthorized copying or unauthorized modification. This well known type of security provided for the data archive is to be contrasted from the type of security concerned with protecting LEA premises equipment from the data archive which is the type of security addressed by the invention described below.

During both intensive analysis and routine handling of the intercepted traffic, the LEA will need to transfer, record, and possibly replay every single packet of the intercepted traffic which was received or sent by the suspect premises equipment 10. The LEA cannot implement a firewall around its premises equipment to protect itself because that would not allow a complete copy of the intercepted traffic to enter the LEA premises for storage. In general for a firewall to serve as an effective security mechanism it must be both robust and cautious in keeping one side of the firewall, which in this case would be the LEA premises equipment 150, secure from malicious traffic originating from the other side, which in this case would be the ISP network 100. Any packets making up a known attack, such as application floods, dummy sessions, software vulnerability exploits, Trojans and others, would be filtered by the firewall so that none would enter into the secure zone, namely, the LEA premises equipment 150. Firewalls also typically have intelligent heuristics which are used to filter any packets which are suspicious, or may constitute an unknown attack. Filtering all known and possible attacks in the intercepted traffic before storage would lead to an incomplete archive of intercepted traffic. In order to obtain a complete copy of the intercepted traffic, the intercepted traffic cannot be filtered by a firewall, and must be stored as it was intercepted. A consequence of not employing a firewall to filter the intercepted traffic as it enters the LEA premises equipment 200 is that it exposes the LEA premises equipment 200 to attack from the very suspect under investigation. In most other systems where data integrity is not a requirement, a firewall used to block or destroy data can serve as an effective security measure. The need to allow for the seemingly mutually exclusive requirements of security from attacks and preservation of data integrity is peculiar to the field of data surveillance by law enforcement agencies.

Deep packet inspection (DPI) may be used as part of a custom analysis application in the LEA premises, but such a solution may result in longer processing times due to resource overload. Moreover, such a solution increases the probability that desired information is missed, and may require the expensive manual rejection of unrelated data.

No existing current system or method adequately addresses the opposing goals of data integrity and security in the context of LEA surveillance and analysis of network traffic associated with a suspect.

SUMMARY OF THE INVENTION

According to one aspect, the invention provides for a system for processing network traffic for lawful intercept surveillance, the system comprising: an archive for storing intercepted network traffic traversing a communications network, said intercepted network traffic comprising benign traffic and malicious traffic, said intercepted traffic received at said archive from a service provider; a traffic separator for separating said benign traffic of said archive from said malicious traffic of said archive, generating clean traffic from said benign traffic; and an analysis application for receiving said clean traffic and for analysis of said clean traffic.

Some embodiments of the invention provide for an attack detection module coupled to said communications network for receiving said intercepted network traffic and for identifying said benign traffic as benign and for identifying malicious traffic as malicious; and a tagging module coupled to an output of said attack detection module and for receiving benign traffic and malicious traffic from said attack detection module, and for tagging each malicious packet of said malicious traffic with an associated indicator indicating that said malicious packet is malicious, generating a respective tagged malicious packet, said tagging module for sending said benign traffic and said respective tagged malicious packet to said archive for storage; wherein said traffic separator performs said separating of said benign traffic from said malicious traffic with use of said indicator associated with each malicious packet.

Some embodiments of the invention provide for a replay engine for accessing both said benign traffic and said malicious traffic stored in said archive, wherein said traffic separator is coupled to an output of said replay engine.

In some embodiments of the invention said tagging is one of VLAN tagging, UDP tagging, and custom encapsulation.

In some embodiments of the invention said attack detection module and said tagging module are part of service provider premises equipment of said communications network, and said archive, said replay engine, said traffic separator, and said analysis application are part of law enforcement agency premises equipment.

In some embodiments of the invention said tagging module is for tagging each benign packet of said benign traffic with an associated indicator indicating that said benign packet is benign, generating a respective tagged benign packet, and for sending said respective tagged benign packet as part of said benign traffic to said archive for storage, and wherein said traffic separator performs said separating of said benign traffic from said malicious traffic with use of said indicator associated with each benign packet.

Some embodiments of the invention provide for an attack detection module coupled to said archive for receiving from said archive said benign traffic and said malicious traffic and for identifying said benign traffic as benign and for identifying said malicious traffic as malicious.

In some embodiments of the invention the traffic separator is coupled to an output of said attack detection module and is one of a filter, a firewall, a blocker, and a switch.

In some embodiments of the invention said archive, said traffic separator, said analysis application, said replay engine, and said attack detection module are part of law enforcement agency premises equipment.

Some embodiments of the invention provide for a tagging module coupled to an output of said attack detection module and for receiving benign traffic and malicious traffic from said attack detection module, and for tagging each malicious packet of said malicious traffic with an associated indicator indicating that said malicious packet is malicious, generating a respective tagged malicious packet, wherein said traffic separator performs said separating of said benign traffic from said malicious traffic with use of said indicator associated with each malicious packet.

In some embodiments of the invention the tagging module is for sending said benign traffic and each respective tagged malicious packet to said archive for storage.

In some embodiments of the invention said tagging module is for tagging each benign packet of said benign traffic with an associated indicator indicating that said benign packet is benign, generating a respective tagged benign packet, and for sending each respective tagged benign packet as part of said benign traffic to said archive for storage, and wherein said traffic separator performs said separating of said benign traffic from said malicious traffic with use of said indicator associated with each benign packet.

According to another aspect the invention provides for a method of processing network traffic for lawful intercept surveillance, the method comprising: intercepting desired network traffic traversing a communications network generating intercepted network traffic, said intercepted network traffic comprising benign traffic and malicious traffic; storing both said benign traffic and said malicious traffic in an archive; separating said benign traffic of said archive from said malicious traffic of said archive, generating clean traffic from said benign traffic; and sending said clean traffic to an analysis application for analysis of said clean traffic.

Some embodiments of the invention provide for, before the step of storing: identifying said benign traffic as benign and identifying said malicious traffic as malicious; and tagging each malicious packet of said malicious traffic after having been identified with an associated indicator indicating that said malicious packet is malicious creating a respective tagged malicious packet, wherein said separating is performed with use of said indicator associated with each malicious packet.

Some embodiments of the invention provide for after the step of storing: accessing both said benign traffic of said archive and said malicious traffic of said archive; and passing said benign traffic and each respective tagged malicious packet to a switch, wherein said separation is performed by said switch.

Some embodiments of the invention provide for tagging each benign packet of said benign traffic after having been identified with an associated indicator indicating that said benign packet is benign creating a respective tagged benign packet, and wherein said separating is performed with use of said indicator associated with each benign packet, and wherein passing said benign traffic to said switch comprises passing each respective tagged benign packet to said switch.

In some embodiments of the invention said tagging is performed in said communications network by service provider premises equipment and said storing, accessing, passing, separating, and sending are performed by law enforcement agency premises equipment.

Some embodiments of the invention provide for before the step of separating: accessing from said archive both said benign traffic and said malicious traffic; and identifying said benign traffic after having been accessed as benign and identifying said malicious traffic after having been accessed as malicious.

In some embodiments of the invention separating further comprises one of deleting, filtering, blocking and rerouting said malicious traffic.

In some embodiments of the invention said intercepting is performed in said communications network by service provider premises equipment, and said storing, separating, and sending are performed by law enforcement agency premises equipment.

Some embodiments of the invention provide for before the step of separating: tagging each malicious packet of said malicious traffic after having been identified with an associated indicator indicating that said malicious packet is malicious, generating a respective tagged malicious packet, wherein said separating is performed with use of said indicator associated with each malicious packet.

Some embodiments of the invention provide for before the step of separating: storing said benign traffic and each respective tagged malicious packet in said archive.

Some embodiments of the invention provide for tagging each benign packet of said benign traffic after having been identified with an associated indicator indicating that said benign packet is benign, generating a respective tagged benign packet, and wherein said separating is performed with use of said indicator associated with each benign packet, and wherein said storing of said benign traffic comprises storing each respective tagged benign packet.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

A system for network traffic interception providing data integrity and security according to a preferred embodiment of the invention is now described with reference to FIG. 2 in terms of its structure.

Figure 2:
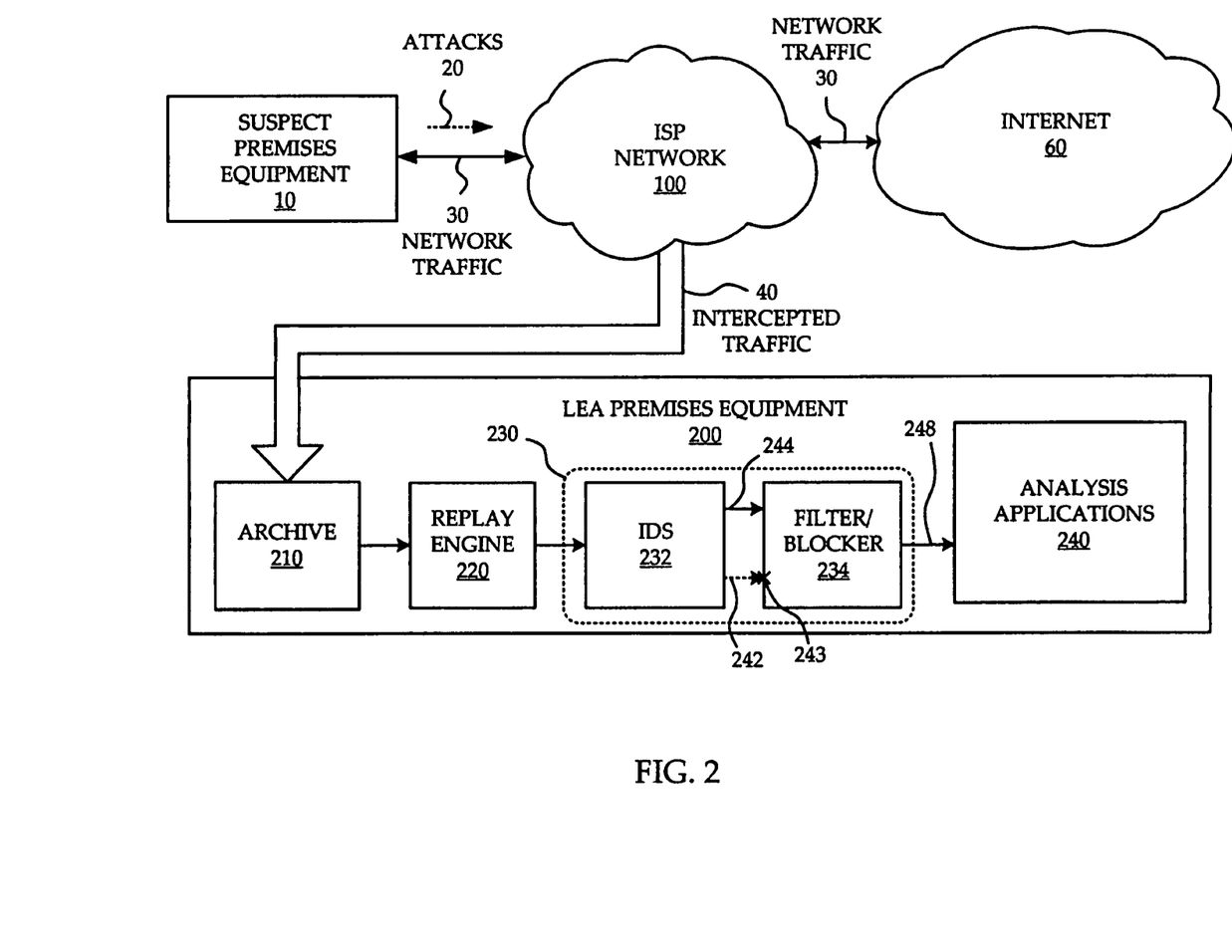
FIG. 2 is a schematic block diagram of a system for processing network traffic for lawful intercept surveillance according to the preferred embodiment of the invention.

In the system of FIG. 2, suspect premises equipment 10 is coupled over a communications network, in this case an ISP network 100, to an internet 60. The ISP network 100 is coupled to LEA premises equipment 200, which comprises an archive 210, which stores incoming traffic from the ISP network 100. Coupled to an output of the archive 210 is a replay engine 220. Coupled to an output of the replay engine 220 is an IPS (intrusion prevention system) module 230 comprising an IDS (intrusion detection system) module 232 and a traffic separator which in this case is a PDU (packet data unit) filter/blocker 234 coupled in series. Coupled to an output of the IPS module 230 are analysis applications 240.

The system of FIG. 2 will now be described in terms of function. Network traffic 30 which comprises desired network traffic containing information desired by the LEA is communicated between the suspect premises equipment 10 and the internet 60 over the ISP network 100. The network traffic 30 comprises malicious attacks 20 embedded therein, originating at the suspect premises equipment 10, and targeted at the LEA premises equipment 200. The desired network traffic of the network traffic 30 is duplicated in and forwarded from the ISP network 100 as intercepted traffic 40 to the LEA premises equipment 200. The LEA premises equipment 200 receives and stores said intercepted traffic 40 in its archive 210. The archive 210 stores all of the intercepted traffic 40 including malicious attacks 20 generated by the suspect premises equipment 10. The traffic collected must be archived somewhere in its totality to ensure the intercepted and stored data conforms to lawful intercept requirements.

Whenever intercepted traffic 40 from the archive 210 is to be accessed for analysis, the traffic is retrieved by the replay engine 220 and passed through the IPS module 230. In the IPS module 230 the IDS module 232 serves to identify the malicious traffic making up the malicious attacks 20 of the intercepted traffic 40. Both benign traffic 244 and malicious traffic 242 are forwarded from the IDS module 232 to the PDU filter/blocker 234. The illustration in FIG. 2 of separate streams of benign traffic 244 and malicious traffic 242 is only a logical representation of the two distinct types of traffic which together make up the single intercepted traffic 40 data stream. The PDU filter/blocker 234 filters, blocks, deletes or reroutes the identified malicious traffic 242, indicated in FIG. 2 by an "X" 243, while forwarding the benign traffic 244 to the analysis applications 240 as clean traffic 248. The analysis applications 240 then analyze the clean traffic 248 for desired information that the LEA may find useful.

In the embodiment depicted in FIG. 2, all the archiving, malicious data filtering, and analysis occurs within the LEA premises equipment. The majority of network attacks, malicious requests and floods, packets with attack signatures and software exploits, etc. are filtered/sifted out by the Intrusion Prevention System (IPS) module 230 and the resulting clean or safe material is used for LEA further analysis. Intercepted traffic 40 remains stored in its original intact form in archive 210 for further presentation in a court of law, and for legal procedure compliance.

A system for network traffic interception providing data integrity and security according to an exemplary embodiment is now described with reference to FIG. 3.

Figure 3:
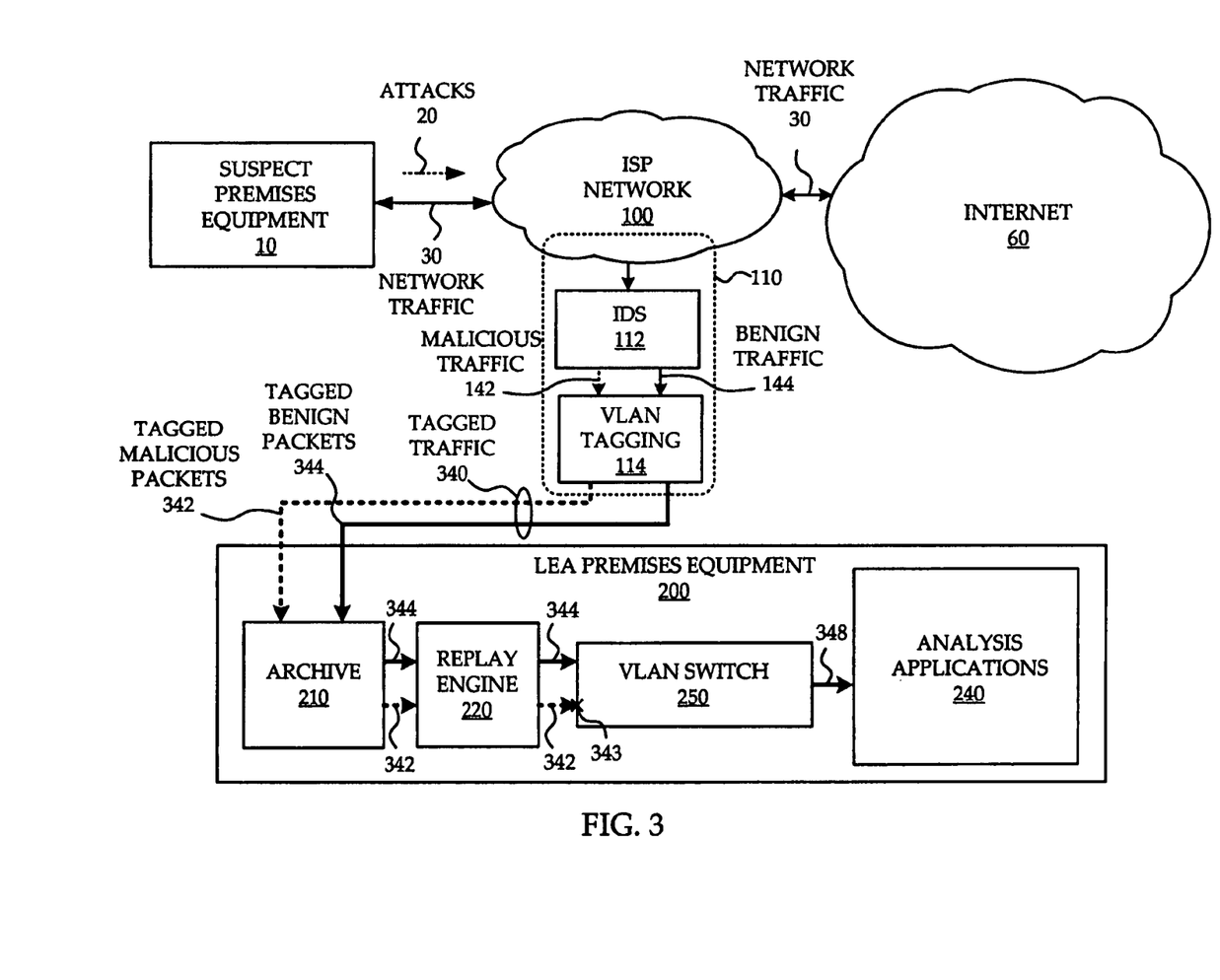
FIG. 3 is a schematic block diagram of a system for processing network traffic for lawful intercept surveillance according to an exemplary embodiment of the invention.

In FIG. 3, the suspect premises equipment 10 is coupled over the ISP network 100 to the internet 60. The ISP network 100 comprises ISP equipment including a network traffic tagger 110, which comprises an IDS module 112, whose output is coupled to a VLAN tagging module 114. The output of the VLAN tagging module 114 is coupled to LEA premises equipment 200, which comprises an archive 210, which stores incoming traffic from the ISP network 100. Coupled to an output of the archive 210 is a replay engine 220. Coupled to an output of the replay engine 220 is a VLAN switch 250. The output of the VLAN switch is coupled to the analysis applications 240.

The system of FIG. 3 will now be described in terms of function. Network traffic 30 which comprises desired network traffic containing information desired by the LEA is communicated between the suspect premises equipment 10 and the internet 60 over the ISP network 100. The network traffic 30 comprises malicious attacks 20 embedded therein, originating at the suspect premises equipment 10, and targeted at the LEA premises equipment 200. The desired network traffic of the network traffic 30 is duplicated in the ISP network 100 and passed through the network traffic tagger 110 to become tagged traffic 340.

In network traffic tagger 110, the IDS module 112 serves to identify any malicious traffic making up the malicious attacks 20 of the desired network traffic. Both benign traffic 144 and malicious traffic 142 are forwarded from the IDS module 112 to the VLAN tagging module 114. The illustration in FIG. 3 of separate benign traffic 144 and malicious traffic 142 is only a logical representation of the two distinct types of traffic which once tagged together make up the tagged traffic 340 data stream. The VLAN tagging module 114 tags malicious packets of the malicious traffic 142 with an associated indicator, which in this case is a VLAN tag, which indicates that the malicious packets are malicious, generating tagged malicious packets 342. The VLAN tagging module also tags benign packets of the benign traffic 142 with an associated indicator, which in this case is a VLAN tag, which indicates that the benign packets are benign, generating tagged benign packets 344. The tagging module 114 forwards both types of packets as tagged traffic 340 to the LEA premises equipment 200.

The LEA premises equipment 200 receives and stores said tagged traffic 340 in its archive 210. The archive 210 stores all of the intercepted tagged traffic 340 including malicious attacks 20 generated by the suspect premises equipment 10. The traffic collected must be archived somewhere in its totality to ensure the intercepted and stored data conforms to lawful intercept requirements in respect of completeness and integrity. Storing both malicious and benign packets in the archive 210 serves to meet these requirements.

Whenever intercepted tagged traffic 340 from the archive 210 is to be accessed, the traffic, both malicious and benign, is retrieved by the replay engine 220 and passed through the VLAN switch 250. The VLAN switch 250 serves to separate the benign traffic from the malicious traffic by discarding the identified tagged malicious packets 342 based on the associated identifier which in this case is a VLAN tag on each tagged packet 340. This discarding is indicated in FIG. 3 by an "X" 343. The VLAN switch 250 forwards the benign packets based on each benign packet's VLAN tag, to the analysis applications 240 as clean traffic 348. The analysis applications 240 then analyze the clean traffic 348 for desired information that the LEA may find useful.

It should be understood that although the network traffic tagger 110 has been depicted as being part of the ISP network 100, in other embodiments the network traffic tagger 110 is part of the LEA premises equipment 200 in which case, as with the embodiment depicted in FIG. 2, the ISP network forwards intercepted network traffic in its originally intercepted form to the LEA premises equipment 200 which performs the identification, tagging and storage of malicious and benign packets.

It also should be understood that although VLAN tagging has been used to mark each packet as either malicious or benign other forms of tagging or tagging with additional encapsulation could be used. For example any IP header which is generated and maintained only by the ISP network may be used for a tagging mechanism since it does not affect the original data of the intercepted packets. A separate or additional encapsulation such as UDP with a customized tag indicating whether a packet is benign or malicious could also be used since none of the original data of the intercepted packets would be affected. In place of the VLAN switch 250 would be another type of switch or filter possibly implemented in software which would use the relevant IP header, UDP encapsulation and associated tag, or some other customized encapsulation, which ever was the case, to separate the benign packets which are to be forwarded to the analysis applications from the malicious packets which are not to be forwarded.

It also should be understood that alternatively, VLAN tagging only of the malicious traffic 142 into tagged malicious packets 342 may be performed. In such a case, the tagged traffic would comprise tagged malicious packets 342 and the benign traffic 144, both of which would be stored in the archive 210. The replay engine 220 would replay the tagged malicious packets 342 and the benign traffic 144 through the VLAN switch 250 which could then discard 343 the tagged malicious packets 342 based on their VLAN tags.

A system for network traffic interception providing data integrity and security according to an alternate embodiment of the invention is now described with reference to FIG. 4 in terms of its structure.

Figure 4:
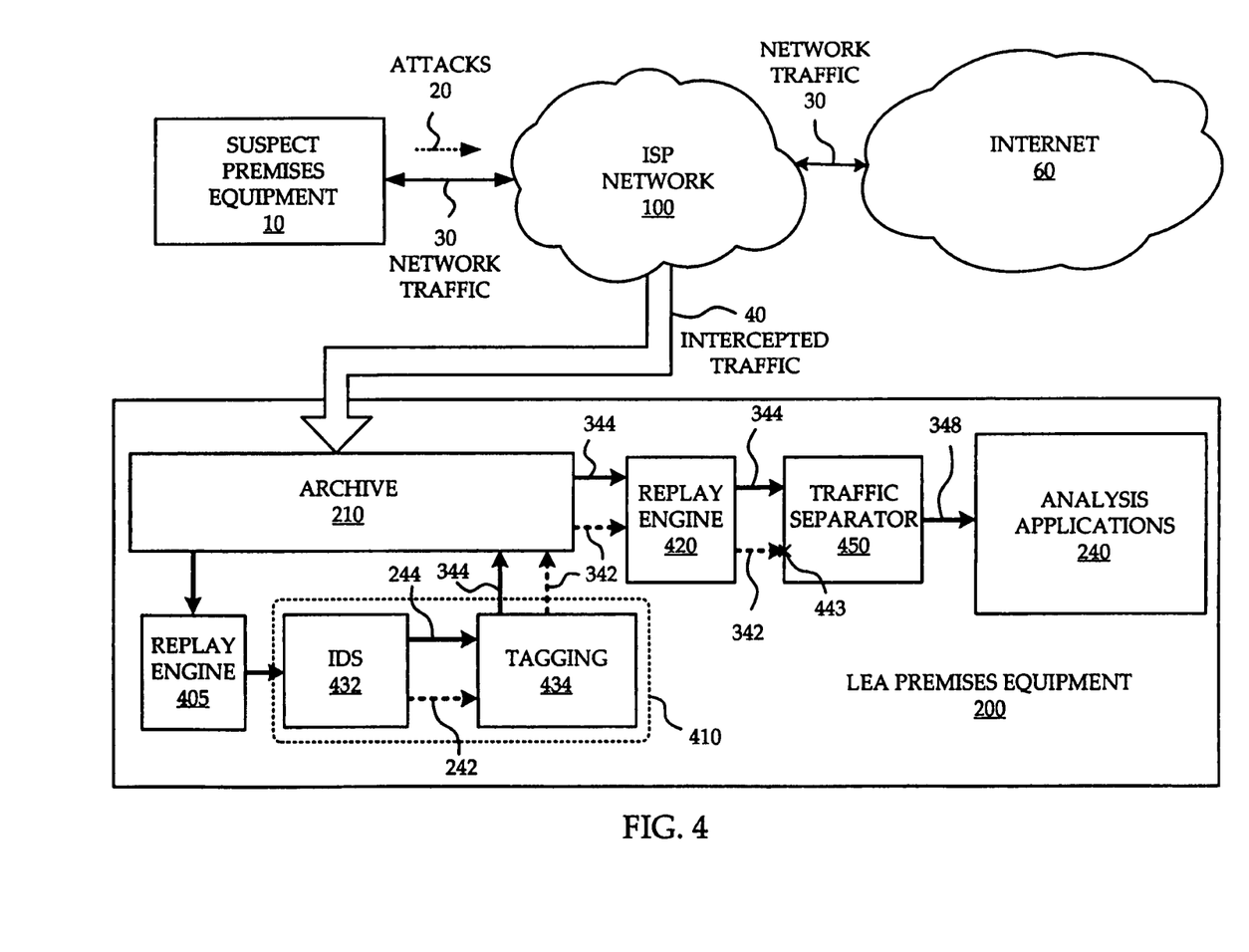
FIG. 4 is a schematic block diagram of a system for processing network traffic for lawful intercept surveillance according to an alternate embodiment of the invention.

In the system of FIG. 4, suspect premises equipment 10 is coupled over an ISP network 100, to an internet 60. The ISP network 100 is coupled to LEA premises equipment 200, which comprises an archive 210, which stores incoming traffic from the ISP network 100. Coupled to an output of the archive 210 is an archive maintenance replay engine 405, whose output is coupled to an archive packet tagger 410 which has an IDS (intrusion detection system) module 432 coupled to a tagging module 434 in series. The tagging module 434 may be a VLAN tagging module, UDP or other header/encapsulating tagging module as discussed above. An output of the tagging module 434 is coupled to the archive 210. For access to the tagged packets of the archive 210, a replay engine 420 has access to all of the tagged packets and has an output coupled to a traffic separator 450 which in this case is a packet switch or filter. Coupled to an output of the traffic separator 450 are analysis applications 240.

The system of FIG. 4 will now be described in terms of function. Network traffic 30 which comprises desired network traffic containing information desired by the LEA is communicated between the suspect premises equipment 10 and the internet 60 over the ISP network 100. The network traffic 30 comprises malicious attacks 20 embedded therein, originating at the suspect premises equipment 10, and targeted at the LEA premises equipment 200. The desired network traffic of the network traffic 30 is duplicated in and forwarded from the ISP network 100 as intercepted traffic 40 to the LEA premises equipment 200. The LEA premises equipment 200 receives and stores said intercepted traffic 40 in its archive 210. The archive 210 stores all of the intercepted traffic 40 including malicious attacks 20 generated by the suspect premises equipment 10. The traffic collected must be archived somewhere in its totality to ensure the intercepted and stored data conforms to lawful intercept requirements.

In an event driven manner, traffic 40 stored in the archive 210 is accessed by the IDS module 432 through archive maintenance replay engine 405 which forwards both benign and malicious portions of the traffic 40. The IDS module 432 identifies traffic as benign or malicious and forwards it by type to the tagging module 434. As was done in association with FIGS. 2 and 3 above, the two types of traffic, malicious and benign are logically represented by two traffic streams, one for malicious traffic 242 and one for benign traffic 244. The tagging module 434 tags both the malicious packets of the malicious traffic 242 and the benign packets of the benign traffic 244 with an associated indicator which serves to identify each packet, as being either one of the tagged malicious packets 342 or tagged benign packets 344. This tagging could be done to the packets stored in the archive 210 periodically so that eventually all packets in the archive 210 could be tagged. Alternatively, only certain packets could be processed through the IDS module 432 and tagging module 434 at any particular time, for example in a specific embodiment the archive packet tagger 410 only identifies and tags packets which have been requested by the replay engine 420. Data would then become categorized as it is accessed over time. As in the embodiment depicted in FIG. 3, whenever intercepted tagged traffic from the archive 210 is to be accessed, the traffic, both malicious and benign, is retrieved by the replay engine 220 and passed through the traffic separator 450. The traffic separator 450 discards the tagged malicious packets 342, based on the associated indicator of each malicious packet 342. This discarding is indicated by an "X" 443. The traffic separator 450 forwards the benign packets based on their associated indicators to the analysis applications 240. The analysis applications 240 then analyze the benign packets for desired information that the LEA may find useful.

It should be understood that although only a single archive 210 is shown, the output of the archive packet tagger 410 could be coupled to a second archive containing only tagged packets. This second archive could be updated on an as needed basis and may serve to reduce processing when the same data is accessed more than once by the replay engine 420.

It also should be understood that alternatively, tagging only of the malicious traffic 242 into tagged malicious packets 342 may be performed. In such a case, tagged malicious packets 342 and the benign traffic 244 only would be output from the archive tagging module 434 for storage in the archive 210. The replay engine 420 would replay the tagged malicious packets 342 and the benign traffic 244 through the traffic separator 450 which could then discard 443 the tagged malicious packets 342 based on their associated indicators or tags.

In the embodiment depicted in FIG. 4, as was the case with the embodiment of FIG. 2, all the archiving, tagging, traffic separating, and analysis occurs within the LEA premises equipment 200.

It should be understood that what is referred to by the term IDS is only a specific example of an attack detection module which serves to detect and identify any type of malicious attack for either the subsequent tagging of specific packets making up that malicious attack or their separation from the benign traffic. Other attack detection modules having the general ability to detect attacks may be implemented in the various embodiments depicted. It should also be understood that the filters/blockers and switches referred to herein are only specific examples of traffic separators which serve to separate identified malicious packets from the benign traffic. Other traffic separators having the general ability to separate identified malicious packets from the benign traffic may be implemented in the various embodiments depicted.

Figure 5:
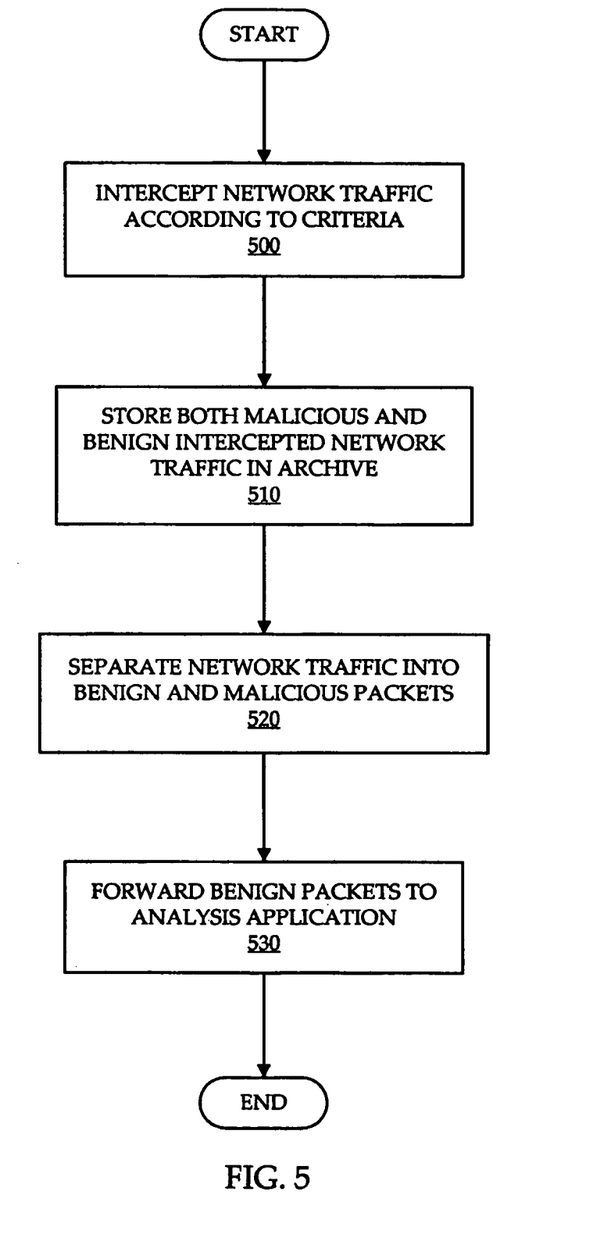
FIG. 5 is a functional block diagram illustrating steps in a method of processing network traffic for lawful intercept surveillance according to a preferred embodiment of the invention.

Referring now to FIG. 5 a method of processing network traffic for lawful intercept surveillance according to a preferred embodiment of the invention will be discussed.

At step 500, desired network traffic traversing the communications network is intercepted according to criteria as discussed in association with the embodiments depicted in FIGS. 2-4. This network traffic comprises both malicious and benign traffic, and is stored in its entirety in an archive in step 510. At step 520 when the data in the archive is required by an analysis application, it is accessed and separated into malicious packets and benign packets possibly with use of an IDS or IPS module. At step 530 the benign packets are forwarded to an analysis application. The method depicted in FIG. 5 is made up of common steps taken by all the systems according to the invention depicted in FIGS. 2-4. Importantly, both malicious and benign traffic is stored in the archive, and before sending clean traffic to an analysis application, benign traffic is separated from the malicious traffic.

Figure 6:
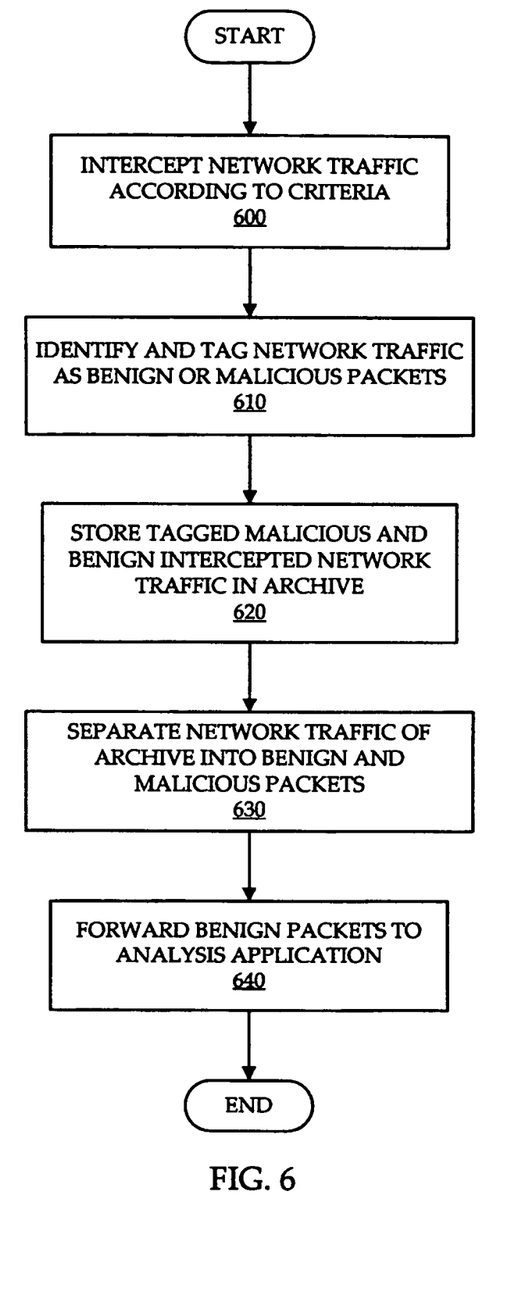
FIG. 6 is a functional block diagram illustrating steps in a method of processing network traffic for lawful intercept surveillance according to an exemplary embodiment of the invention.

Referring now to FIG. 6, a method of processing network traffic for lawful intercept surveillance according to an exemplary embodiment of the invention will be discussed.

At step 600, desired network traffic traversing the communications network is intercepted according to criteria as discussed above. This network traffic comprises both malicious and benign traffic. At step 610 malicious packets of malicious traffic and benign packets of the benign traffic are identified and tagged with an indicator as malicious and conversely benign packets possibly with use of an IDS or IPS module and a tagging module. At step 620 both types of tagged packets, malicious and benign, are stored in an archive. When data is to be accessed from the archive at step 630, the network traffic is replayed and separated into benign and malicious packets with use of the indicator. Finally at step 640, the malicious packets are dropped while the benign packets are forwarded to the analysis application.

Figure 7:
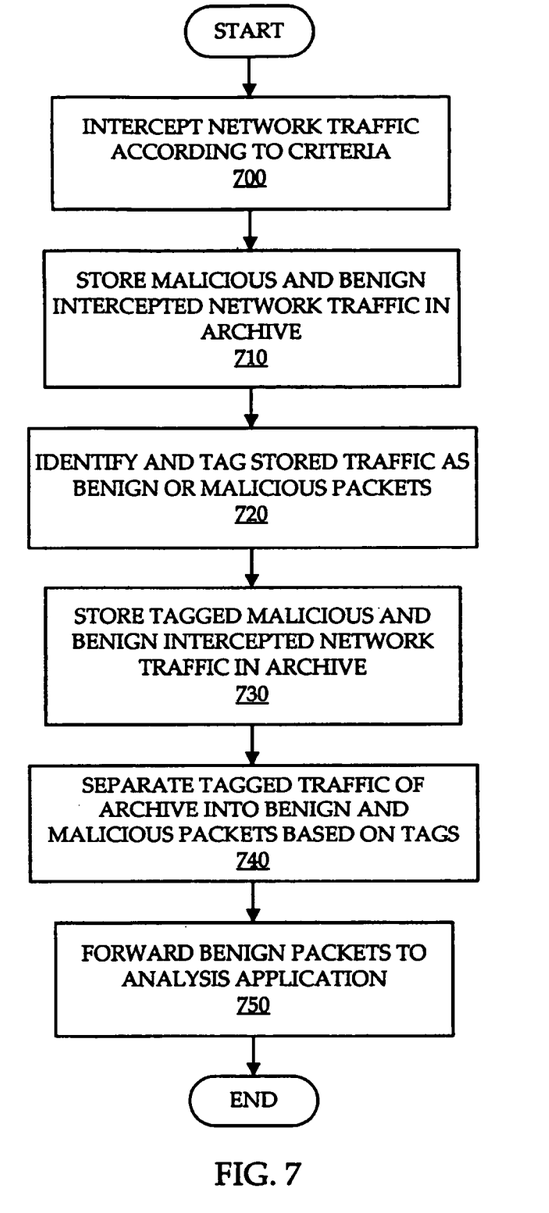
FIG. 7 is a functional block diagram illustrating steps in a method of processing network traffic for lawful intercept surveillance according to an alternate embodiment of the invention.

Referring now to FIG. 7, a method of processing network traffic for lawful intercept surveillance according to an alternate embodiment of the invention will be discussed.

At step 700, desired network traffic traversing the communications network is intercepted according to criteria as discussed above. This network traffic comprises both malicious and benign traffic, and is stored in its entirety in an archive in step 710. At step 720 on a periodic basis and particularly when the data in the archive is required by an analysis application, the traffic is accessed and separated into malicious packets and benign packets possibly with use of an IDS or IPS module and tagged as such with an indicator. At step 730 both types of tagged packets, malicious and benign, are stored in the archive. In other embodiments the tagged packets may be stored in another archive. When data is to be accessed from the archive at step 740, the network traffic is replayed and separated into benign and malicious packets with use of the indicator. Finally at step 750, the malicious packets are dropped while the benign packets are forwarded to the analysis application.

The embodiments presented are exemplary only and persons skilled in the art would appreciate that variations to the embodiments described above may be made without departing from the spirit of the invention. The scope of the invention is solely defined by the appended claims.

We claim:

1. A system that is configured to process network traffic for lawful intercept surveillance, the system comprising:
   an equipment including:
      an archive that is configured to store intercepted network traffic traversing a communications network, said intercepted network traffic comprising benign traffic and malicious traffic, wherein said intercepted traffic is received at said archive from a service provider;
      a traffic separator that is configured to separate said benign traffic of said archive from said malicious traffic of said archive, and generate clean traffic from said benign traffic; wherein the traffic separator is a Virtual Local Area Network (VLAN) switch or a packet data unit filter/blocker;
      an analysis application that is configured to receive said clean traffic and analyze said clean traffic;
      an attack detection module coupled to the communications network that is configured to receive the intercepted network traffic, identify the benign traffic as benign, and identify the malicious traffic as malicious; and
      a tagging module, coupled to an output of the attack detection module, that is configured to receive the benign traffic and the malicious traffic from the attack detection module, tag each malicious packet of the malicious traffic with an associated indicator indicating that the malicious packet is malicious, generate a respective tagged malicious packet, tag each benign packet of the benign traffic with an associated indicator indicating that the benign packet is benign, generate a respective tagged benign packet, and send the respective tagged malicious packet and the respective tagged benign packet to the archive for storage, wherein the traffic separator performs the separating of the benign traffic from the malicious traffic with use of the indicator associated with each malicious packet and the indicator associated with each benign packet.

2. A method of processing network traffic for lawful intercept surveillance, the method comprising:
   intercepting desired network traffic traversing a communications network generating intercepted network traffic, said intercepted network traffic comprising benign traffic and malicious traffic;
   identifying the benign traffic as benign;
   tagging each benign packet of the identified benign traffic with an associated indicator;
   identifying the malicious traffic as malicious; and
   tagging each malicious packet of the identified malicious traffic with an associated indicator;
   storing both said tagged benign traffic and said tagged malicious traffic in an archive;
   separating, at a traffic separator, said tagged benign traffic from said tagged malicious traffic, wherein the separating is performed with use of the indicator associated with each tagged malicious packet and the indicator associated with each tagged malicious packet;
   generating clean traffic from said benign traffic; and
   sending said clean traffic to an analysis application for analysis of said clean traffic, wherein said traffic separator is a Virtual Local Area Network (VLAN) switch or a packet data unit filter/blocker.

3. The method of processing network traffic according to claim 2, wherein the traffic separator is a switch and the method further comprises, after the step of storing:
   accessing both said benign traffic of said archive and said malicious traffic of said archive; and
   passing said benign traffic and each respective tagged malicious packet to said switch, wherein said separation is performed by said switch.

4. The method according to claim 3, wherein said tagging is one of VLAN tagging, User Datagram Protocol (UDP) tagging, and custom encapsulation.

5. The method according to claim 4, wherein said tagging is performed in said communications network by service provider premises equipment and said storing, accessing, passing, separating, and sending are performed by law enforcement agency premises equipment.

6. The method of processing network traffic according to claim 2, wherein the separating further comprises:
   one of deleting, filtering, blocking and rerouting said malicious traffic.

7. The method of processing network traffic according to claim 2, wherein said intercepting is performed in said communications network by service provider premises equipment, and said storing, separating, and sending are performed by law enforcement agency premises equipment.

8. The method of processing network traffic according to claim 2, wherein said tagging is one of VLAN tagging, User Datagram Protocol (UDP) tagging, and custom encapsulation.

9. A method of processing network traffic for lawful intercept surveillance, the method comprising:
   intercepting desired network traffic traversing a communications network generating intercepted network traffic, said intercepted network traffic comprising benign traffic and malicious traffic;
   storing both said benign traffic and said malicious traffic in an archive;
   separating at a traffic separator said benign traffic of said archive from said malicious traffic of said archive;
   tagging each benign packet of the benign traffic with an associated indicator;
   tagging each malicious packet of the malicious traffic with an associated indicator;
   generating clean traffic from said benign traffic; and sending said clean traffic to an analysis application for analysis of said clean traffic, wherein said traffic separator is a Virtual Local Area Network (VLAN) switch or a packet data unit filter/blocker.

10. The system for processing network traffic according to claim 1, the system further comprising:
a replay engine that is configured to access both said benign traffic and said malicious traffic stored in said archive, wherein said traffic separator is coupled to an output of said replay engine.

11. The system for processing network traffic according to claim 10, wherein said tagging is one of Virtual Local Area Network (VLAN) tagging, User Datagram Protocol (UDP) tagging, and custom encapsulation.

12. The system for processing network traffic according to claim 11, wherein said attack detection module and said tagging module are part of service provider premises equipment of said communications network, and said archive, said replay engine, said traffic separator, and said analysis application are part of law enforcement agency premises equipment.

13. The system for processing network traffic according to claim 1, wherein the traffic separator is coupled to an output of said attack detection module and is one of a filter, a firewall, a blocker, and a switch.

14. The system for processing network traffic according to claim 1, wherein said archive, said traffic separator, said analysis application, said replay engine, and said attack detection module are part of law enforcement agency premises equipment.

15. The system for processing network traffic according to claim 1, wherein said tagging is one of Virtual Local Area Network (VLAN) tagging, User Datagram Protocol (UDP) tagging, and custom encapsulation.

* * * * *